July 27, 1943.  A. BÜCHI  2,325,032
CONTROL DEVICE FOR SCAVENGED, IGNITION-TYPE ENGINES
Filed Nov. 25, 1939  4 Sheets-Sheet 2

Inventor:
Alfred Büchi
by Sommers & Young
Attorneys

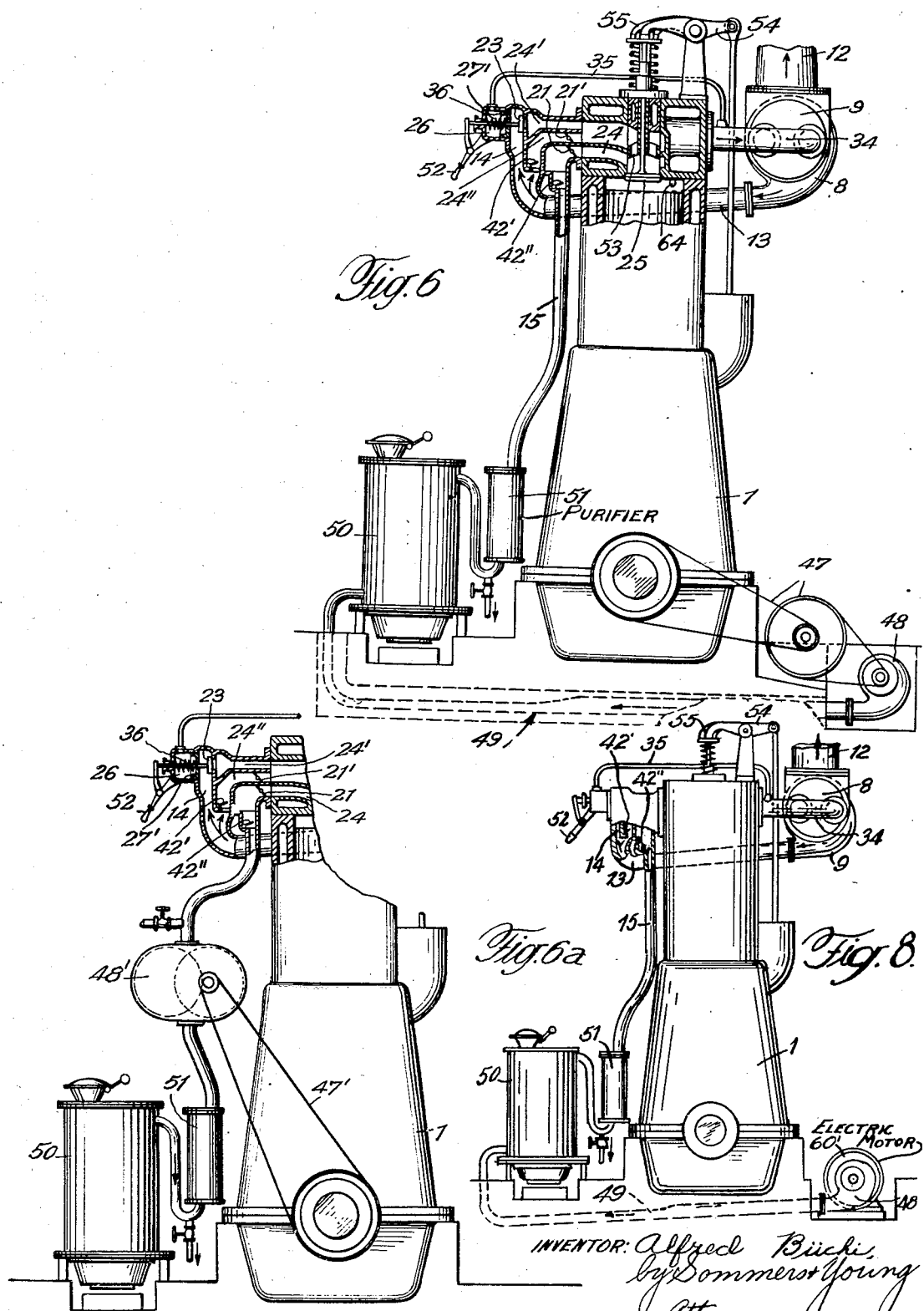

July 27, 1943.  A. BÜCHI  2,325,032
CONTROL DEVICE FOR SCAVENGED, IGNITION-TYPE ENGINES
Filed Nov. 25, 1939    4 Sheets-Sheet 4
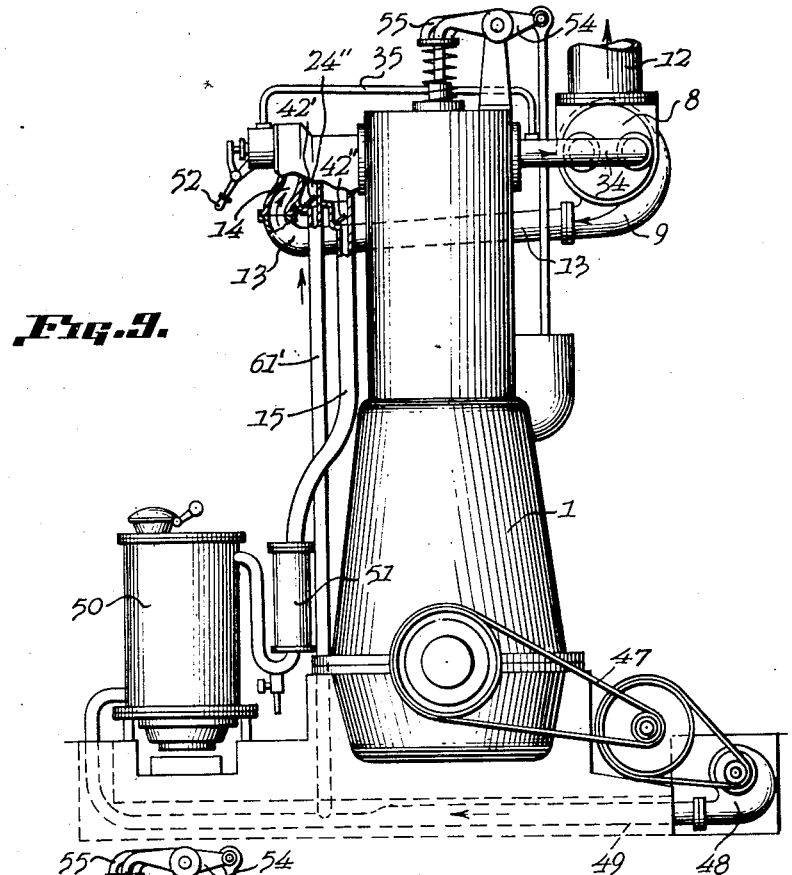
Fig. 9.
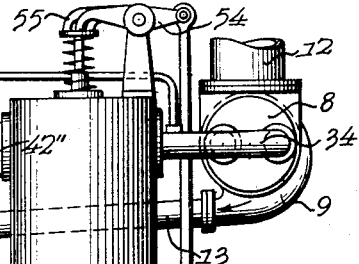
Fig. 10.
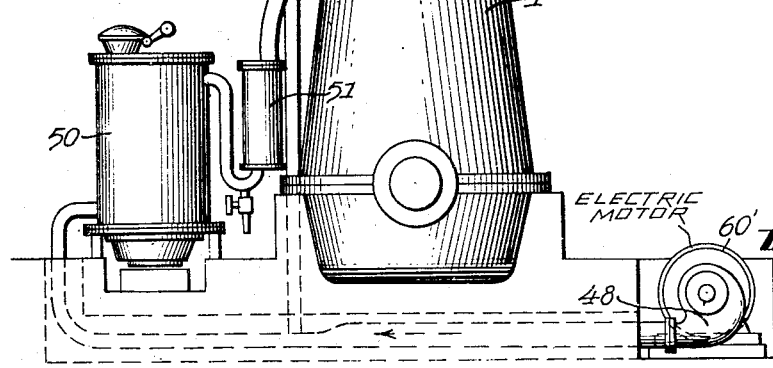
INVENTOR,
ALFRED BÜCHI.
by Sommers + Young
ATTYS.

Patented July 27, 1943

2,325,032

UNITED STATES PATENT OFFICE 2,325,032

CONTROL DEVICE FOR SCAVENGED, IGNITION-TYPE ENGINES

Alfred Büchi, Winterthur, Switzerland

Application November 25, 1939, Serial No. 306,192
In Switzerland September 1, 1939

12 Claims. (Cl. 60—13)

This invention relates to admission control devices for internal combustion engines operating by means of scavenging and with throttling of the charging air or fuel-air mixture and separate ignition of the charge.

It is known to provide in advance of the inlet members arranged in the cylinders of internal combustion engines of this kind separate mechanically controlled members which alternately admit scavenging air and gas-air mixture to the inlet members arranged in the individual cylinder at predetermined time intervals.

According to this invention, the controlling of the timing of the scavenging air is effected by separate scavenging air admission control members which are separated from the charging air or mixture inlet control members and which are both arranged in advance of the ordinary inlet members or valves mounted in the cylinders of the internal combustion engine, which scavenging air control members are operated by action of the pressure existing at any desired point in the engine cylinders or in the exhaust gas conduit leading out from the exhaust members mounted in these cylinders.

A further object of this invention is to control the action of the separate inlet members for the scavenging air by mutual action of the gas pressure in the cylinders or behind them and the scavenging or charging pressure in advance of the internal combustion engine.

Another object of this invention is to control the time of action of the scavenging air control members in accordance with the operating conditions of the engine at the particular time by influencing the timing of said control members in accordance with certain existing pressure conditions in the engine or engine exhaust conduit singly or jointly with the pressure of the air in an air intake conduit. Especially such pressure effects are utilized which set up approximately at the time or, preferably, exactly at the time during which the intended scavenging of the engine cylinders is required to take place.

Therefore, the invention is particularly useful in connection with internal combustion engines having exhaust gas turbine driven charging blowers, wherein the exhaust gases from the engine cylinders are passed to or through the exhaust gas turbine, for individual cylinders or groups of cylinders separately, and wherein during the scavenging periods pressure drops are created in the exhaust gas manifolds by special measures. The resulting low pressure periods in regard to the scavenging air pressure are utilized in the cylinders, as is known per se, for scavenging with precompressed air, when the inlet and exhaust members are simultaneously open.

With internal combustion engines operating with exhaust gas turbine driven blowers, the arrangement may be such that the turbine driven blower supplies solely the scavenging air, while the fuel and charging air together or individually may be supplied by a separate blower or pump, for example, a blower driven by the internal combustion engine itself.

In the accompanying drawings several embodiments of the invention are schematically represented for the purpose of illustration together with diagrams illustrating the operation. Like numerals or characters indicate like parts in several figures.

In the drawings,

Fig. 1 illustrates the variations of pressure of the exhaust gases and of the scavenging air together with such variations of the actual charge after leaving and before entering the internal combustion engine respectively. It further shows the opening times of the inlet members known per se and of the separate inlet members according to the invention, during the scavenging and the actual charging operation, for a group of three cylinders of a six-cylinder four-cycle internal combustion engine cooperating with an exhaust gas turbine driven blower;

Figures 4, 7:
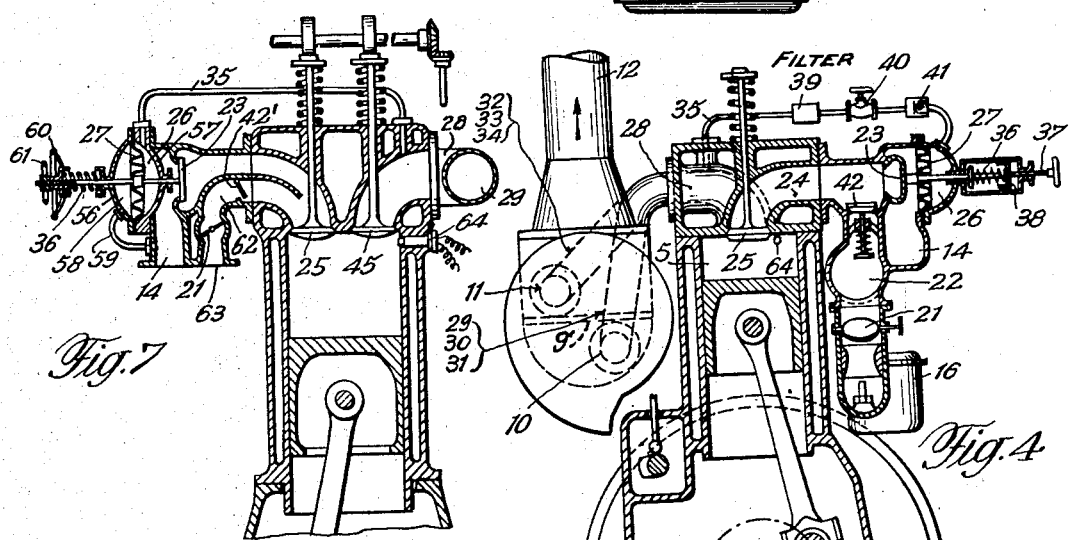
Fig. 4 is a vertical sectional view on the line IV—IV of Fig. 3.

Fig. 6 exemplifies another form of the invention as embodied in a gas engine operating by means of charging air;

Fig. 6a shows a modified detail of Fig. 6;

Fig. 7 exemplifies a still further form of the invention by illustrating an admission control device for scavenging air and charge; and Fig. 8 shows a further modification.

Fig. 9 is an end view partially in section of a modification of the embodiment shown in Fig. 6.

Fig. 10 is a view similar to Fig. 9 of a slightly modified embodiment.

Figure 1:
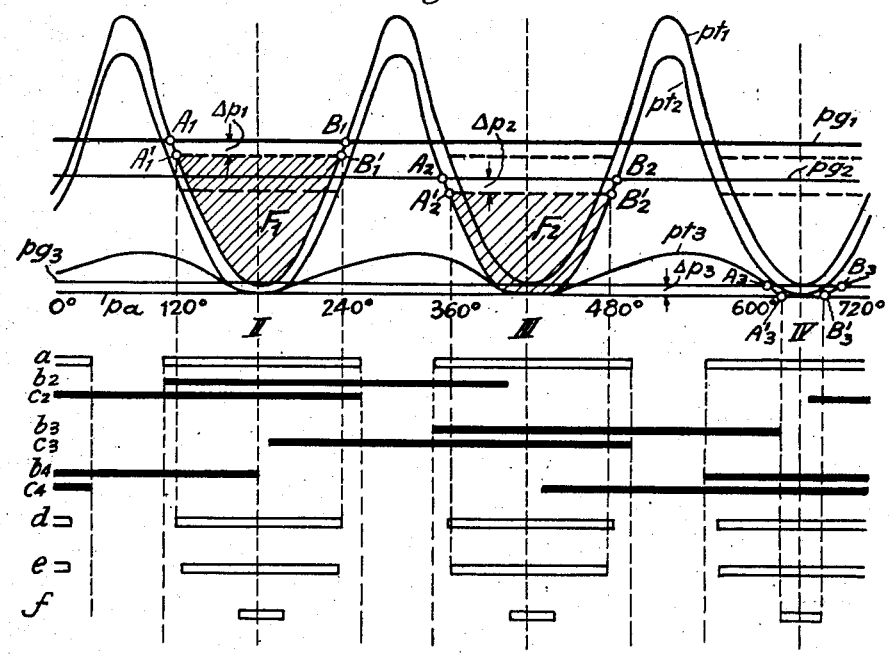

Fig. 1 shows in its upper diagrammatic part three different exhaust gas pressure curves $pt_1$, $pt_2$ and $pt_3$ which are plotted against crank angles within a range of 0 and 720° corresponding to two revolutions of the crank shaft, the curves having been obtained by tests on an exhaust manifold leading out from the working or engine cylinders of a six-cylinder four-cycle internal combustion engine having the cranks offset 120° relatively to each other. The individual pressure curves are derived from three cylinders 2, 3, 4, Fig. 3, in which ignition takes place at equal crank angles of 240° apart. The scavenging dead centers are designated in Fig. 1 by II, III and IV.

Figure 3:
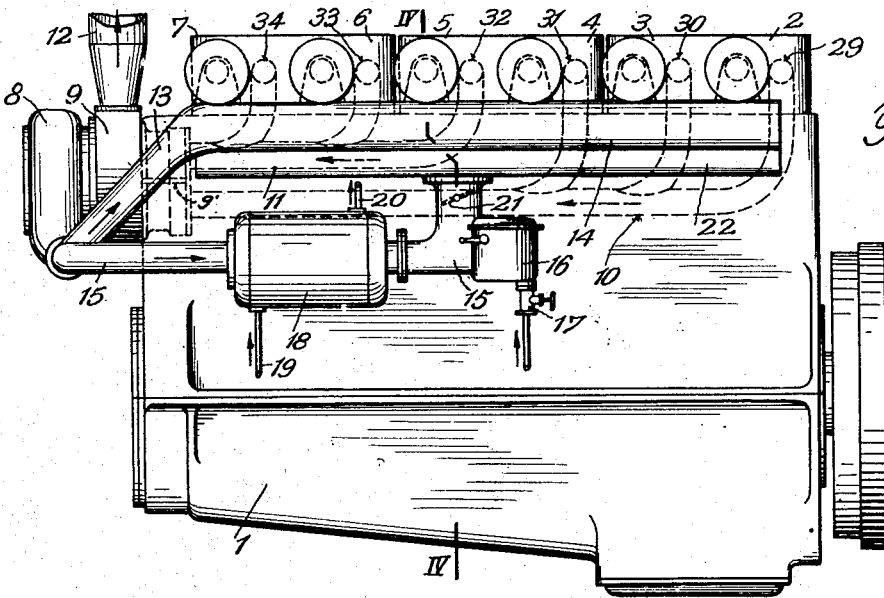
Fig. 3 is a side elevation of a six-cylinder four-cycle internal combustion engine which is provided with an exhaust gas turbine driven charging blower and in which the invention is embodied in a certain form.

The pressure curves derived from the three other cylinders 5, 6, 7 (Fig. 3) of this engine would be similar to the curves illustrated but offset relatively thereto by a time phase corresponding to an angle of 120° The reason for this is, that the three cylinders 5, 6, 7 exhaust into a common exhaust manifold 11, shown in dotted lines in Figs. 3 and 4, leading the gases through an exhaust gas turbine 9 in common with the gases from cylinders 2, 3, 4 which exhaust into exhaust pipe 10, the gases from the two groups of cylinders being maintained separate in the turbine by division wall 9' which provides separate turbine inlet nozzle spaces. Again, the exhaust manifolds extending between the cylinders and the turbine have such a small volume and the entrance port areas to the exhaust turbine are so dimensioned that the pressure of the exhaust gases varies considerably in advance of the turbine. The reference character $pa$ designates the atmospheric pressure. Let it be assumed that the exhaust gas turbine drives a charging blower independently of the internal combustion engine and that by this blower at all the three loadings above referred to constant charging pressures $pg_1$, $pg_2$ and $pg_3$ respectively are produced. From the relative course of the exhaust gas pressure curves $pt_1$, $pt_2$, $pt_3$ and the charging air pressure curves $pg_1$, $pg_2$, $pg_3$ it is evident that when $pt_1$ is lower than $pg_1$, that is, during the time period $A_1$—$B_1$, the scavenging of the engine cylinders is theoretically possible if the inlet and exhaust valves are simultaneously open. For the purposes of practice let it be assumed that a small excess $\Delta p_1$ is required for opening the separate scavenging member representing one feature of the invention. The actual scavenging period will thus occur in the time period $A'_1$—$B'_1$. At that time a pressure difference exists between the charging pressure $pg_1$ and the exhaust gas pressure $pt_1$ as indicated by the hatched area $F_1$.

In the event that the loading corresponds to the exhaust gas pressure $pt_2$ and the charging pressure $pg_2$, equality of these pressures exists in the points $A_2$ and $B_2$. In the time period lapsing between these points, scavenging is thus feasible. Let it be assumed that a small difference in pressure $\Delta p_2$ is also necessary for opening the separate scavenging member so that in reality the scavenging operation is maintained during the time period $A'_2$—$B'_2$. The low pressure area is represented by the hatched area $F_2$.

In the event that the loading corresponds to the exhaust gas pressure $pt_3$ and the charging pressure $pg_3$ the separate scavenging member begins to open only in point $A'_3$, and closes in point $B'_3$, so that the scavenging period is considerably shortened in this case compared with the higher loadings. The scavenging member still opens just a trifle. The relative course of the pressure curves $pt_3$ and $pg_3$ may alternatively also be such that no opening at all of the separate scavenging member takes place.

Below the pressure diagrams, on the line $a$ the maximum possible scavenging periods obtained by means of the fixed adjustment of the control means of the inlet and exhaust members mounted in the cylinders are plotted. The opening periods of the inlet members are represented by the heavy lines $b_2$, $b_3$, $b_4$ for the cylinders 2, 3, 4 and those of the exhaust members by $c_2$, $c_3$, $c_4$. Below these lines the scavenging periods, $A'_1$—$B'_1$; $A'_2$—$B'_2$ and $A'_3$—$B'_3$ corresponding to the three loadings illustrated in the diagram above are shown as being represented by lines $d$, $e$, $f$. These scavenging periods $d$, $e$, $f$ are always followed by the actual charging operations as the piston of the internal combustion engine keeps on moving. These are not indicated in the diagram of Fig. 1 for the reason that in this respect the lines $b_2$, $b_3$, $b_4$ representing the times of control of the inlet members mounted in the cylinder are believed to explain this matter clearly.

If, as shown in other figures, in the charging conduit automatically closing inlet members for the charge are arranged, toward the pressure conduit supplying the charge to the charging blower, the moment at which these members close and thus the inlet period becomes variable in accordance with the load, particularly when the charging pressure as existing in the charge supply conduit is reached.

Figure 2:
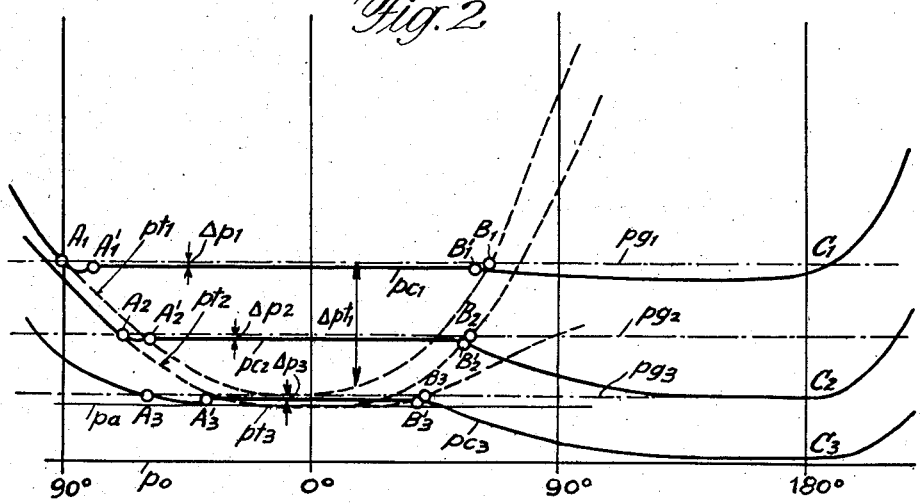
Fig. 2 illustrates in contrast thereto the variations of pressure in a working cylinder of a like engine at different loadings.

In Fig. 2 the variations of pressure in an engine cylinder are plotted against the crank angles of the internal combustion engine as these variations are obtained at different loads at the end of the exhaust period, during the scavenging, the charging operation, and the initial portion of the compression, when the mode of operation according to the invention is adopted. The reference character $pc_1$, $pc_2$, $pc_3$ represent the pressures in the cylinder at three different loadings of the internal combustion engine. The reference characters $A'_1$, $A'_2$, $A'_3$ designate the beginning and $B'_1$, $B'_2$ and $B'_3$ the end of the scavenging periods as these end points are established according to the invention at the various loads corresponding to the exhaust gas pressures $pt_1$, $pt_2$, $pt_3$ behind the cylinders of the internal combustion engine.

Let it be assumed that the pressures of the precompressed scavenging air and of the charge are alike and equal to $pg_1$, $pg_2$ and $pg_3$. In advance of the points $A_1$, $A_2$, $A_3$ in which the pressures $pc_1$, $pc_2$, $pc_3$ in the respective engine cylinders are equal to the pressures $pg_1$, $pg_2$, $pg_3$ of the precompressed scavenging air, that is, the charge, the pressure of the gases present in the cylinder decreases, due to the discharging operation then being in progress. Under the assumption that for opening the separate inlet members for the scavenging air an excess of pressure $\Delta p_1$, $\Delta p_2$ and $\Delta p_3$ respectively is required, these separate inlet members, therefore, open only at the points $A'_1$, $A'_2$ and $A'_3$ respectively. The pressures $pt_1$, $pt_2$, $pt_3$ behind the cylinders of the internal combustion engine and in advance of the exhaust gas turbine thus keep on decreasing for the reason that the connecting conduits leading to the turbine are provided with small volumes and the cross section of the nozzle arranged at the entrance to the turbine is dimensioned in accordance with the amount of exhaust gas and scavenging air discharging. With a view to obtain a high scavenging effect it is intended to produce in the exhaust gas manifold, about the scavenging dead center, a drop in pressure as far down to atmospheric pressure $pa$ as possible. Consequently, a great pressure difference, for example, equal to $pt_1$, exists during the scavenging operation between the entrance for the scavenging air and the exhaust side of the internal combustion engine by which means a plenteous amount of scavenging air passes in and through the cylinder into the exhaust gas conduit.

Owing to the control of the scavenging air inlet members provided by means of the exhaust gas pressure existing in the engine cylinders or between the internal combustion engine and the turbine the scavenging period endures up to the points $B_1$, $B_2$ and $B_3$, that is, theoretically until the pressures $pt_1$, $pt_2$, $pt_3$ of the exhaust gases behind the internal combustion engine are lower than the pressures $pg_1$, $pg_2$, $pg_3$ of the scavenging air. In reality the scavenging period ends somewhat earlier, specifically, in the points $B'_1$, $B'_2$, $B'_3$, due to the fact that on the side of admittance of the scavenging air a somewhat higher pressure is required for closing the inlet members for the scavenging air again. After the completion of the scavenging, that is, from $B'_1—C_1$, $B'_2—C_2$, $B'_3—C_3$, admission of the actual charge takes place, that is, pure air, when engines are involved which operate by means of fuel injected or blown into the engine cylinders, or else fuel-air mixture supplied by fuel mixers, gas generators, carburettors, or the like, when in advance of the internal combustion engine a mixer, atomizer, carburettor, gas generator, or the like is arranged.

As previously stated, the invention has the further characteristic feature that in the supply conduit for the charge leading to the engine cylinders throttling members are included by means of which the pressure of the charge received in the engine cylinder can be reduced to such an extent that the combustibility necessary for the remote ignition at the corresponding loading and fuel admission is ensured.

From Fig. 2 this throttling effect can be clearly derived from the course of the curves $B'_1—C_1$, $B'_2—C_2$, $B'_3—C_3$. As the load on the engine increases this throttling effect must decrease. At the smallest load this effect must, however, be of marked intensity to which end in the engine cylinder a relatively intense vacuum, for example, up to approximately zero-pressure $p_0$ must be produced. On the termination of the operation of admitting the charge compression of the charge received takes place behind points $C_1$, $C_2$, $C_3$. In the event that only pure air is admitted to the cylinder by means of the charging member, the fuel can be added to the charge in advance of the regular inlet member mounted in vance of the engine cylinder, or the fuel may be passed into the engine cylinder by direct introduction thereinto prior and/or during the compression stroke.

In Fig. 3 an internal combustion engine 1 having six working cylinders 2, 3, 4, 5, 6 and 7 is shown in side elevation. This engine receives the necessary scavenging air and charge through a blower 8 driven by an exhaust gas turbine 9. This exhaust gas turbine is fed with the exhaust gases from the internal combustion engine through two exhaust gas manifolds 10, 11 that are entirely independent of each other and lead the exhaust gases from the cylinders 2, 3, 4 and 5, 6, 7 respectively quite separately to the runner of the turbine. The exhaust gases leave the exhaust gas turbine via a conduit 12.

In accordance with the invention, precompressed air is supplied by the blower 8 into the scavenging air intake passage 14 through a conduit 13. On the other hand part of the air precompressed in the blower 8 is supplied through a conduit 15 in a carburettor 16 into which the fuel enters through a regular member 17. In the instance illustrated it is assumed that the precompressed air is passed through a cooler 18 prior to entering the carburettor, the cooling fluid entering the cooler through a conduit 19 and leaving it again through a conduit 20. According to the invention, at a certain point in the length of the conduit 15 a throttling member 21 (shown in dotted lines) is included in the latter as desired. The conduit 15 is connected with a charge manifold 22 extending longitudinally of the engine.

Fig. 4 shows in a cross section of a cylinder of the internal combustion engine along the line IV—IV in Fig. 3 the particular construction of the parts of the engine forming part of the invention in schematic manner. These parts include per engine cylinder a scavenging air inlet member 23 for shutting the admission passage 24 leading to the inlet valve 25 in cylinder 5 from the scavenging air intake passage 14. As previously explained in connection with the disclosure of the method of operation, according to the invention, the member 23 is opened when in the space 26 the pressure is lower than in the space 14. For realising this, a membrane 27 is arranged between these two spaces and is connected with the member 23 in such manner that the latter automatically opens when the pressure in the space 26 is lower than that in the space 14. In order to provide for the pressure $pt$ of the exhaust gases to be effective behind the internal combustion engine in the space 26, a gas pressure conduit 35 is provided which connects space 26 with the exhaust passage 28 for passing the gases into the exhaust gas conduit 32 and thence over to the manifold 11. In order to provide for adjusting the beginning of the opening operation of the scavenging air inlet member 23, a spring 36 acts on the membrane from the right which spring can be energized in a variable degree by means of a screw 37 through the intermediary of a spring cup 38. From the left hand side, the membrane is acted upon by the pressure $pg$ of the precompressed charge in the space 14 so that the drop in pressure of the exhaust gases behind the exhaust gas turbine required for opening the scavenging air inlet member 23 need be only small.

For preventing the space 26 being contaminated by the exhaust gases a filtering device 39, Fig. 4, for keeping back all harmful particles, may be included in the conduit 35. Furthermore, a throttling member 40 may be included in this conduit by means of which the admission of exhaust gas into the space 26 can be adjusted to a certain amount. Moreover, a check valve 41 may be included in this conduit for preventing the exhaust gas pressure exerted on the membrane 27 from becoming too great. The check valve 41 is intended to open, for example, only after the pressure $pt$ in the exhaust gas conduit 35 has dropped to a value which no longer affects the membrane 27 in a detrimental manner. This can be a spring-opened check valve 41 which opens to the conduit 35 when the gas pressure in the latter has fallen to a certain admissible value. If the gas pressure in the conduit 35, however, is higher than admissible, the check valve 41 will automatically be held closed by the excessive gas pressure overcoming the spring pressure. As further characteristic members in advance of the admission passage 24 to each engine cylinder a back-pressure valve 42 is arranged. These back-pressure valves 42 act to pass the charge from out of the manifold 22 specifically after the scavenging air inlet members 23 have closed. At the beginning of the compression phase the valve members 42 close again automatically.

Figure 5:
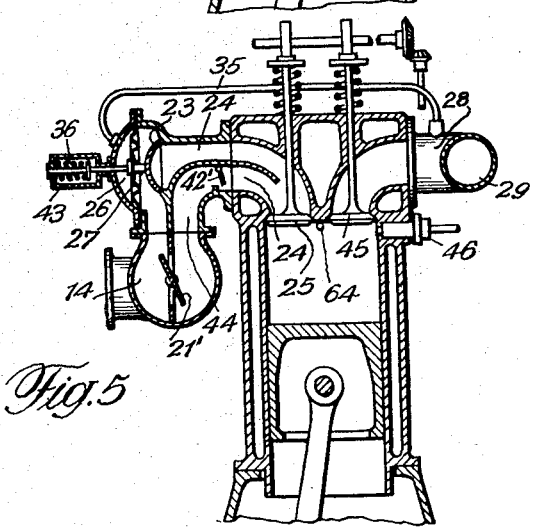
Fig. 5 shows a further embodiment of the invention, by way of example, also in a section of an engine cylinder.

In Fig. 5 a further embodiment of the invention is shown in a section of the engine cylinder also. The internal combustion engine concerned operates by means of fuel injection into the engine cylinders. The numeral 14 designates the supply conduit for the pre-compressed air which passes as scavenging air via the inlet member 23 to the inlet valve 25 opening to the engine cylinders. The member 23 is opened by the membrane 27 when in the space 26 on the left hand side of the membrane the exhaust gas pressure $pt$ is lower than the air pressure $pg$ in the space 14. The space 26 is connected with the exhaust gas side, for example, the exhaust gas conduit 29 through the conduit 35. In this case, the exhaust gas pressure is thus derived from another point than in the embodiment shown in Fig. 4. The exhaust gas pressure can be derived from anywhere between a certain point in the exhaust gas manifolds 10, 11 and the associated cylinder end, in fact, from the cylinder end directly. The membrane 27 is loaded by a spring 36 which is accommodated in a housing 43. For the supplying of the charging air a supply manifold 44 is provided which also leads to the inlet valve 25. In this conduit a back-pressure member in the form of a flap valve 42' is included as close to the inlet valve 25 as possible.

The member 23 is supplied with air also by the passage 14 like the back-pressure member 42' for the charge. For permitting the pressure in the manifold 44 to be adjusted in accordance with the loading and the speed of the engine, a control throttle valve 21' is included in the passage 14. The passage 14 is connected with the charging blower in a manner not shown, for example, a blower as designated by 8 in Fig. 3, and the conduit 29 is connected with the exhaust manifold of the engine. The exhaust gases discharge from the cylinder through an exhaust valve 45. The injection of the fuel is effected by a nozzle 46 for fuel injection in a manner known per se.

In Fig. 6 the invention is further exemplified as embodied in a gas engine operating by means of charging air. In this arrangement, a blower 48 mechanically driven by the internal combustion engine 1, for example, by means of a belt drive 47 is provided in addition to the exhaust gas turbine driven blower 8. This additional blower supplies combustion air to a gas generator 50 through a conduit 49. The gas generated passes through a gas purifier 51 which can be of any suitable kind, and through conduit 15 to passage 24 and inlet valve 25 in the engine cylinder. Adjacent to the inlet valve 25 a throttle valve 21 is included in the conduit 24 as well as a back-pressure flap valve 42".

Instead of the blower 48 a blower 48' driven by the engine by means of a belt drive 47' may be arranged with its suction connected with the gas generator and delivering into the conduit 15 (as shown in Fig. 6a). Alternatively, the blower 48 may be driven from any other source of power, if desired. The blower 48' delivers gas instead of air as the blower 48 does.

The exhaust gas turbine driven blower 8 supplies air only through conduit 13 to the inlet members for scavenging and charging air arranged on the cylinder. By 23 again the separate scavenging air inlet member is denoted which, in this case is actuated by a plunger 27' the left hand end of which is acted upon by the exhaust gas pressure behind the internal combustion engine, whereas the right hand end of this plunger is acted upon by the pressure in the space 14. This space is connected with the conduit 13. The plunger 27' is loaded by a spring 36, a leverage 52 being provided, whereby the scavenging air valve can be opened or maintained closed from without. A part of the precompressed air supplied through conduit 13 passes via a back pressure flap valve 42' into a passage 24" which also leads to the inlet valve 25. In the passage 24" also a throttling member 21' is included. By accordingly adjusting the throttling members 21, 21' the supply of gas and air to the inlet valve 25 can be regulated in regard to pressure and/or production of gas-air mixture. The inlet valve 25 in the cylinder may be of a construction as conventionally used for such valves of gas engines.

This valve may, for instance, cooperate with a sleeve valve 53 which is actuated by the lever 55 from the cam shaft of the engine, as is generally known in gas engine practice, and by means of which the gas or air supply can be additionally controlled. The scavenging air entering through the member 23 first passes into a passage 24' which is separated from the space 24" at least up to a point located behind the throttling member 21'. Thence the air passes into the space in advance of the inlet member 25. The passages 24, 24" are separated up to the valve 53. The inlet valve 25 and the additional valve 53 are actuated through the intermediary of valve tappets 54, 55. The exhaust gases leave the cylinder through an exhaust valve not shown, and thence pass to the exhaust gas turbine 8 through exhaust gas conduit 34 and then into the atmosphere through conduit 12.

The operation of a gas engine constructed as shown in Fig. 6 is as follows:

At the end of the exhaust stroke the scavenging operation begins, if initiated by the exhaust gas pressure existing in the conduit 35 and thus in the space 26, and endures as long as said pressure is effective in this respect. The valves 21 and 21' are open in normal operation and on the termination of the scavenging, the two flap valves 42', 42" open, after they had been kept closed during the scavenging period, that is, while the inlet member 23 was open, so that through the flap valve 42" a certain amount of gas enters under a certain pressure in dependence upon the adjustment of the throttle valve 21, the latter and the throttle valve 21' being always open but to different extents as the load on the engine varies, and admission of pure air takes place via the back pressure flap valve 42' under the influence of throttling action of throttle valve 21'.

Fig. 7 exemplifies a further embodiment of the invention by showing another admission arrangement for scavenging air and charge.

Also in this case the member 23 controls the scavenging air; the membrane 27 which is connected with this valve member is, however, included in a casing 56, 57. In the space 26 the exhaust gas pressure behind the internal combustion engine is active, this pressure being transmitted through the conduit 35, whereas in the space 58 to the left of the membrane 27 the same pressure exists as in the space 14, through the intermediary of the conduit 59. The valve 23 opens by its valve body, which is pressed on its seat by the spring 36, shifting to the right. The effort of the spring 36 is adjustable by accordingly controlling a hand wheel 60 which is threadedly connected with the stem of the valve 23. A handwheel 61, which is also threadedly connected (not shown) with the stem of this valve serves for adjusting the effort of the spring 36 to a certain value. The admission of the charge is effected through a passage 62 in which the back pressure flap valve 42' is arranged as closely to the inlet valve 25 as possible, whereas the flap valve 21 is arranged at the other end of the passage 62. The whole intake arrangement is housed in a casing 63 so that it can be secured to the cylinder head as a self-contained unit.

In Fig. 7 as well as in Figs. 4, 5 and 6, the ignition device arranged in the engine cylinder is designated by 64. This device may be of any suitable construction.

Fig. 8 shows a modification of Fig. 6, and differs from the latter only inasmuch as the blower 48 for supplying combustion air to gas generator 50 is driven by an electric motor 60' instead of by the engine 1 via the belt drive 47. The speed of motor 60' should be such as to drive blower 48 at substantially the same speed as in Fig. 6 in which the blower is driven by the engine.

The embodiment of the invention shown in Fig. 9 is similar to that of Fig. 6 except that only the scavenging air is supplied by the exhaust gas driven turbine, the charging air being supplied by a blower or pump 48 driven by power transmission means 47 connected with the engine. The blower 48 supplies air to gas generator 50 through pipe 49. The gas then passes to the engine through purifier 51 and pipe 15 similarly as in the embodiment of Fig. 6. A branch air pipe 61' extends from air pipe 49 to the charging air conduit of the engine, which is independent of the scavenging air conduit.

In Fig. 10 the same arrangement as in Fig. 9 is provided except that the blower or pump 48 is driven by an independent drive means, such as an electric motor 60', instead of the engine driven means.

What I claim is:

1. In admission control apparatus for internal combustion engines of the ignition type operating by means of precompressed charges of fuel-air mixture and scavenging with air, an internal combustion engine having cylinders, said cylinders having inlet means, induction conduits communicating with said inlet means in advance thereof, exhaust gas conduits leading from said engine cylinders, separate scavenging air admission control members arranged in said induction conduits, exhaust gas conduction means communicating with the exhaust gas conduits of said cylinders and with said scavenging air admission control members for controlling the timing of operation of the scavenging air inlet members by the momentary differential pressure between the inlet and exhaust conduits of said engine in dependence on the condition of operation of said engine, by action of the variable exhaust gas pressure transmitted through said conduit, and means arranged in the inlet means for the charge for timing the inlet of charge to the cylinders.

2. In admission control apparatus for internal combustion engines of the ignition type operating by means of precompressed charges of carbureted air and with scavenging with air, an internal combustion engine having cylinders, said cylinders having inlet means, induction conduits for scavenging air and for charge communicating with said inlet means in advance thereof, exhaust gas conduits leading out from said engine cylinders, separate scavenging air admission control members arranged in said scavenging air induction conduits, exhaust gas conduction means communicating with the exhaust gas conduits of said cylinders and with said scavenging air admission control members for controlling the timing of the scavenging air inlet means by the momentary differential pressure between the inlet pressure in the scavenging air conduit and the pressure in the exhaust conduits in accordance with the condition of operation of said engine, by action of the variable exhaust gas pressure transmitted through said exhaust gas conduction means, and means arranged in the charge induction conduit of each cylinder for timing the charge inlet.

3. In admission control apparatus for internal combustion engines operating by means of separate ignition of precompressed charges of fuel-air mixture and scavenging with air, an internal combustion engine having cylinders, an exhaust gas turbine driven blower for supplying charging and scavenging air for said cylinders, said cylinders having inlet means, induction means communicating with said inlet means in advance thereof, an exhaust conduit communicating with said turbine and associated engine cylinders, the exhaust gas pressure in said conduit varying in time with the successive scavenging periods in said cylinders and dropping below the pressure of the available scavenging air, separate scavenging air admission control members arranged in said induction means, exhaust gas conduction means communicating with said exhaust conduit and with said scavenging air admission control members for controlling the timing of the scavenging air inlet means by the momentary differential pressure between the inlet and exhaust conduits in accordance with the condition of operation of said engine by action of the variable exhaust gas pressure transmitted through said exhaust conduit to the exhaust gas driven turbine, means arranged in the induction means of each cylinder for controlling the flow of charge, and means for interrupting said flow during the open period of the scavenging air admission control member.

4. In admission control apparatus for internal combustion engines operating by separate ignition of precompressed charges of fuel-air mixture and with scavenging with air, said internal combustion engine having cylinders, an exhaust gas turbine driven compressing machine for supplying the air for scavenging and charging said engine cylinders, a compressing machine driven by said engine for supplying the fuel proper to said cylinders, said cylinders having inlet members, induction conduits communicating with said inlet members in advance thereof, and with said exhaust gas turbine driven and said engine driven compressing machines, exhaust gas conduits leading out from said engine cylinders, separate scavenging air admission control members arranged in said induction conduits, exhaust gas conduction means communicating with the exhaust conduits of said cylinders and with said scavenging air admission control members for controlling the timing of the scavenging air inlet members by the momentary differential pressure between the inlet and exhaust conduits in accordance with the condition of operation of said engine, by action of the variable exhaust gas pressure transmitted through said exhaust gas conduction means, and means arranged in the induction conduit for the charge of each cylinder for timing the flow of the charge to the inlet member of each cylinder.

5. In admission control apparatus for internal combustion engines operating by separate ignition of precompressed charges of fuel-air mixture, an internal combustion engine having cylinders, an exhaust gas turbine driven compressing machine for supplying the air for scavenging and charging said engine cylinders, a compressing machine driven by a source of power independent of said engine for supplying the fuel proper to said cylinders, said cylinders having inlet members, induction conduits communicating with said inlet members in advance thereof, and with said exhaust gas turbine driven and said independently driven compressing machines, exhaust gas conduits leading out from said engine cylinders, separate scavenging air admission control members arranged in said induction conduits, exhaust gas conduction means communicating with the exhaust conduits of said cylinders and with said scavenging air admission control members for controlling the timing of the scavenging air inlet members by the momentary pressure differential existing between the induction and exhaust conduits in accordance with the condition of operation of said engine, by action of the variable exhaust gas pressure transmitted through said conduits, and flow-control means arranged in said induction conduits for the charge of each cylinder for preventing flow of charge to the inlet member in said cylinder during the open period of the scavenging air control member.

6. In admission control apparatus for internal combustion engines operating by means of separate ignition of precompressed charges of fuel-air mixture and scavenging with air, an internal combustion engine having cylinders, said cylinders having inlet and exhaust means, air induction conduits communicating with said inlet means in advance thereof, exhaust gas conduits leading out from said exhaust means, separate scavenging air admission control members arranged in said induction conduits, exhaust gas conduction means communicating with the exhaust conduits of said cylinders and with said scavenging air admission control members for controlling the timing of the scavenging air inlet members by the momentary differential pressure between the air and gas of said inlet and exhaust conduits in accordance with the condition of operation of said engine, by action of the variable exhaust gas pressure transmitted through said conduction means, means arranged in the induction conduit for the charge of each cylinder for interrupting flow of charge to the inlet means of said cylinder during the opening period of the scavenging air control member, and further control means in said induction conduits in advance of the inlet means opening toward said engine cylinders for separate admission of the charge.

7. In admission control apparatus for internal combustion engines operating by means of separate ignition of precompressed charges of fuel-air mixture, an internal combustion engine having cylinders having inlet and exhaust means, air induction conduits communicating with said inlet members in advance thereof, exhaust gas conduits leading out from said exhaust means, separate scavenging air admission control members arranged in said induction conduits, exhaust gas conduction means communicating with the exhaust conduits of said cylinders and with said scavenging air admission control members for controlling the timing of the scavenging air inlet control members by the momentary differential pressure between the inlet and exhaust conduits in accordance with the condition of operation of said engine, by action of the variable exhaust gas pressure transmitted through said conduction means, means arranged in the charge induction means of each cylinder for preventing flow of charge to the inlet means in said cylinder during the open period means of the scavenging air control member, and a throttling member in said further induction means for adjusting the pressure to different values during the charging of said cylinders.

8. In admission control apparatus for internal combustion engines operating by means of separate ignition of precompressed charges of fuel-air mixture and with scavenging with air, an internal combustion engine having cylinders, said cylinders having inlet and exhaust means, induction conduits for the scavenging and charging air communicating with said inlet means in advance thereof, exhaust gas conduits leading out from said exhaust means, separate scavenging air admission control members arranged in said induction conduits, exhaust gas conduction means communicating with the exhaust conduits of said cylinders and with said scavenging air admission control members for controlling the timing of the scavenging air inlet members by the momentary differential pressure between the inlet and exhaust conduits in accordance with the condition of operation of said engine, by action of the variable exhaust gas pressure transmitted through said exhaust gas conduction means, means arranged in the charge induction conduit of each cylinder for preventing the flow of the charge to the inlet means in said cylinder during the open period of the scavenging air control member, and means for separating the portions of said induction conduits extending between said scavenging air control members and said inlet means for the charge up to close proximity to said inlet means.

9. In admission control apparatus for internal combustion engines operating by means of separate ignition of precompressed charges of fuel-air mixture and with scavenging with air, a plurality of internal combustion engine cylinders arranged in groups of a plurality of cylinders, said cylinders having inlet means and exhaust means, induction means communicating with said inlet means in advance thereof, exhaust gas conduits leading out from said exhaust means, a scavenging air admission control member included in the induction conduit of each of said cylinders, exhaust gas conduction means communicating with the exhaust conduits of said cylinders and with the respective scavenging air admission control members for controlling the timing of the scavenging air inlet members by the momentary differential pressure between the inlet and exhaust conduits in accordance with the condition of operation of said engine, by action of the variable exhaust gas pressure transmitted through said conduction means, and a non-return pressure member arranged in the induction conduit for the charge of each cylinder for interrupting the flow of the charge to the inlet means in said cylinder during the open period of the scavenging air control member.

10. In admission control apparatus for internal combustion engines operating by means of separate ignition of precompressed charges of fuel-air mixture, a gas operated internal combustion engine having cylinders, said cylinders having inlet and exhaust ports, induction conduits leading toward said inlet ports in advance thereof, exhaust gas conduits leading out from said exhaust ports, separate scavenging air admission control members arranged in said induction conduits, exhaust gas conduction means communicating with the exhaust conduits of said cylinders and with said scavenging air admission control members for controlling the timing of the scavenging air inlet members by the momentary differential pressure between the induction and exhaust conduits in accordance with the condition of operation of said engine, by action of the variable exhaust gas pressure transmitted through said exhaust gas conduction means, two further separate induction conduits for the fuel and the charging air leading from said first mentioned induction conduit to said inlet ports, and a non-return member and a throttling member included in each of said further induction conduits.

11. In admission control apparatus for internal combustion engines which operate by separate ignition of precompressed charges of fuel-air mixture and with scavenging, said engine having cylinders, inlet members included in said cylinders, induction conduits communicating with said inlet members in advance thereof, fuel induction means, exhaust gas conduits leading out from said engine cylinders, separate scavenging air admission control members arranged in said induction means, exhaust gas conduction means communicating with the exhaust conduits of said cylinders and with said scavenging air admission control members for controlling the timing of the scavenging air inlet members by the momentary differential pressure between the inlet and exhaust conduits of said engine in adaptation to the condition of operation of said engine, by action of the variable exhaust gas pressure transmitted through said exhaust gas conduction means, and at least one non-return pressure member arranged in the inlet means for the charge of each cylinder for interrupting the flow of the charge to the inlet member in said cylinder during the opening period of the scavenging air control member, an exhaust turbine driven blower for supplying air for scavenging and forming the fuel charge for said engine, means for separately cooling the air for forming the charge, said cooling means being arranged between said blower and the fuel induction means.

12. In a supercharged internal combustion engine having a cylinder provided with an inlet port and an exhaust port, means for controlling flow through each of said ports, an exhaust conduit connected to the exhaust port of said cylinder, a charge induction conduit leading toward said inlet port, means for supplying compressed fuel-air mixture to said charge induction conduit, a scavenging air induction conduit leading to said inlet port, means for supplying compressed scavenging air to said scavenging air induction conduit, a scavenging air flow control member arranged in said scavenging air induction conduit, said air control member having means responsive to exhaust pressure for actuating said member to stop the flow of scavenging air when the pressure in the exhaust conduit exceeds the scavenging air pressure, means for transmitting the exhaust gas conduit pressure to said pressure responsive means, and charge flow control means in said charge induction conduit.

ALFRED BÜCHI.